(12) United States Patent
Ruff et al.

(10) Patent No.: US 7,544,119 B2
(45) Date of Patent: Jun. 9, 2009

(54) APPARATUS, SYSTEM, AND METHOD FOR POSITIONING POULTRY, MEAT, AND FISH PRODUCT PIECES ON A CONVEYOR

(75) Inventors: James Ruff, Springdale, AR (US); Kelvin D. Lasse, Springdale, AR (US); Tim Reddell, Bentonville, AR (US); Marshall Vanderpool, Bentonville, AR (US); Charley Lee Reed, Jr., Tontitown, AR (US); Brandon Haley, Springdale, AR (US); Angela D. Haley, legal representative, Siloam Springs, AR (US)

(73) Assignee: Tyson Foods, Inc., Springdale, AR (US)

( * ) Notice: Subject to any disclaimer, the term of this patent is extended or adjusted under 35 U.S.C. 154(b) by 812 days.

(21) Appl. No.: 11/083,455

(22) Filed: Mar. 18, 2005

(65) Prior Publication Data

US 2006/0210674 A1  Sep. 21, 2006

(51) Int. Cl.
*A22C 25/08* (2006.01)
(52) U.S. Cl. ..................................................... 452/183
(58) Field of Classification Search ................. 198/382, 198/383, 340, 392, 533, 387; 452/177–183
See application file for complete search history.

(56) References Cited

U.S. PATENT DOCUMENTS

| | | | |
|---|---|---|---|
| 1,788,136 A | 1/1931 | Vaughan et al. | |
| 2,501,961 A * | 3/1950 | Paton | 198/382 |
| 2,577,086 A | 12/1951 | Magnuson | |
| 2,781,885 A | 2/1957 | Taylor | |
| 3,154,073 A * | 10/1964 | Klinger | 128/206.12 |
| 3,154,805 A | 11/1964 | Egee et al. | |
| 3,292,765 A | 12/1966 | Loveless | |
| 3,339,703 A | 9/1967 | Pinkham et al. | |
| 3,572,547 A | 3/1971 | Walberg | |
| 3,711,897 A * | 1/1973 | Viscolosi | 452/118 |
| 3,797,195 A | 3/1974 | Brink et al. | |
| 3,871,515 A * | 3/1975 | Randrup | 198/383 |
| 4,123,289 A | 10/1978 | Bourgeois | |
| 4,371,481 A * | 2/1983 | Pollock | 264/15 |
| 4,766,990 A | 8/1988 | Colombo | |
| 5,082,141 A | 1/1992 | Martin et al. | |
| 5,314,375 A * | 5/1994 | O'Brien et al. | 452/157 |
| 5,325,954 A | 7/1994 | Crittenden et al. | |
| 5,341,914 A | 8/1994 | DeMars et al. | |
| 5,871,080 A | 2/1999 | Manzi et al. | |
| 6,079,543 A | 6/2000 | Palmaer | |
| 6,241,073 B1 * | 6/2001 | McAllister et al. | 198/382 |
| 6,435,334 B1 | 8/2002 | Spatafora | |

OTHER PUBLICATIONS

International Search Report for PCT/US/2006/07799.

* cited by examiner

*Primary Examiner*—Thomas Price
(74) *Attorney, Agent, or Firm*—Fellers, Snider, Blankenship, Bailey & Tippens, P.C.; Dennis D. Brown (57) ABSTRACT

An apparatus for positioning poultry, meat, or fish product pieces on a conveyor and a system and method which utilize the inventive apparatus. The inventive apparatus comprises an array of side-by-side upwardly arched product channels and a plurality of catch members mounted for rotating through the product channels such that they lift and pull the product pieces through the upwardly arched product channels and then release the product pieces onto the conveyor.

22 Claims, 7 Drawing Sheets

APPARATUS, SYSTEM, AND METHOD FOR POSITIONING POULTRY, MEAT, AND FISH PRODUCT PIECES ON A CONVEYOR

FIELD OF THE INVENTION

The present invention relates to apparatuses, systems, and methods for positioning poultry, meat, and fish product pieces on a conveyor.

BACKGROUND OF THE INVENTION

A need presently exists for an effective and efficient automated system for continuously placing and positioning individual boneless tenders and other poultry, meat, and fish product pieces on conveyor belt for further processing. A need particularly exists for an effective and efficient automated system for continuously positioning, spacing, and orienting marinated and/or breaded tender or strip products on a conveyor belt for cooking, freezing, or other downstream operations. The proper positioning, spacing, and orientation of tender or strip products is necessary in order to prevent the product pieces from freezing or sticking together and is also important for optimizing downstream treatments, increasing production rates, preventing product damage, and increasing product consistency, uniformity, and quality.

Marinated or breaded chicken tenders and other similar poultry, meat, and fish products are difficult to properly spread, space, and align across the width of a conveyor system. Unfortunately, the systems proposed heretofore for automating this process have not been adequate, particularly with regard to the need to provide sufficient spacing and separation of the product pieces. Consequently, the process of placing and properly positioning the product pieces on a conveyor is typically performed manually and can require several workers, thus significantly increasing the cost of production and also presenting an increased potential for possible product contamination.

Previously, an attempt has been made to automate the process of positioning tender or strip products on a conveyor by feeding the tender or strip products onto the conveyor using a vibrating shaker tray. Shaker tray devices are commercially available from Key Technologies and others. The use of a shaker tray for feeding the product pieces directly to the conveyor has been somewhat effective for distributing the mass of tender or strip products across the width of the conveyor and for flattening the mass into a single layer, but has not provided consistent or adequate spacing or alignment.

Attempts have also been made to use vacuum systems to place individual product pieces onto a conveyor. Unfortunately, however, the vacuum lifting mechanism tends to pull marinade or breading from the product at the point of contact. In addition, the delivery of the product to the vacuum system itself must be precisely controlled in order to ensure continuous consistent operation. Further, a single vacuum system is only capable of placing one piece of the product on the conveyor at a time. Multiple vacuum units are required to load a convey belt to its full capacity. Vacuum systems are also typically very costly to purchase and maintain.

SUMMARY OF THE INVENTION

The present invention provides an apparatus, a system, and a method for positioning poultry, meat, or fish product pieces on a conveyor which satisfy the needs and alleviate the problems discussed above. The inventive system is economical and is highly effective for automatically and continuously placing tender, strip, or other poultry, meat, or fish product pieces on a conveyor belt such that the product pieces are distributed across the width of the conveyor and are properly spaced and longitudinally aligned for freezing, cooking, or other downstream operations.

In one aspect, there is provided an apparatus for positioning poultry, meat, or fish product pieces on a conveyor comprising an array of at least two upwardly arched product channels having a receiving side and a delivery side. The upwardly arched product channels have slots therein which extend from the receiving side to the delivery side. The apparatus further comprises a plurality of catch members mounted for retractably projecting from the slots and for rotating through the upwardly arched product channels in a manner effective for catching and lifting the product pieces on the receiving side, pulling the product pieces through the upwardly arched product channels to the delivery side, and retracting from the slots on the delivery side.

In another aspect, there is provided a system for positioning poultry, meat, or fish product pieces on a conveyor comprising a singulation device and a shaker tray on the receiving side of the singulation device. The singulation device has an array of at least two upwardly arched product channels having slots therein which extend from the receiving side to the delivery side of the singulation device. The singulation device also has a plurality of catch members mounted for retractably projecting from the slots and for rotating through the upwardly arched product channels in a manner effective for catching and lifting the product pieces on the receiving side and pulling the product pieces through the upwardly arched product channels to the delivery side.

In another aspect, there is provided a method of positioning poultry, meat, or fish product pieces on a conveyor comprising the steps of: (a) delivering the product pieces to a receiving side of an array of at least two upwardly arched product channels having catch members which rotate through the upwardly arched product channels; (b) continuously catching the product pieces with the catch members; (c) lifting and pulling the product pieces with the catch members over and through the upwardly arched product channels from the receiving side to a delivery side of the array; and (d) releasing the product pieces from the catch members on the delivery side such that the product pieces are deposited from the upwardly arched product channels onto the conveyor.

Further aspects, features, and advantages of the present invention will be apparent to those in the art upon examining the accompanying drawings and upon reading the following detailed description of the preferred embodiments.

DETAILED DESCRIPTION OF THE PREFERRED EMBODIMENTS

An embodiment 2 of the inventive singulation apparatus is depicted in FIGS. 1-10. The inventive singulation apparatus 2 comprises: a support frame 4; an array 6 of side-by-side upwardly arched product channels 8, said array 6 having a receiving side 10 and a delivery side 12; a guard 14 positioned above the array 6 of product channels 8; and a rotating assembly 16 having a plurality of catch members 18 projecting therefrom. The rotating assembly 16 operates to retractably rotate the catch member 18 through the product channels 8 for catching the tenders, strips, or other poultry, meat, or fish product pieces 20 and then lifting and pulling the product pieces over and through the product channels 8 from the receiving side 10 to the delivery side 12. The channel array 6 includes at least two product channels 8 and will preferably include a sufficient number of side-by-side channels 8 to extend across the width of the conveyor onto which the product pieces 20 are to be deposited.

The catch members 18 can include hooked portions, barbs, or any other features capable of catching and retaining the product pieces 20 in a manner effective for lifting and pulling the product pieces 20 over and through the product channels 8. The catch members 18 are preferably rigid or substantially rigid hooked or barbed finger elements of the type depicted in FIGS. 5-7.

Figure 1:
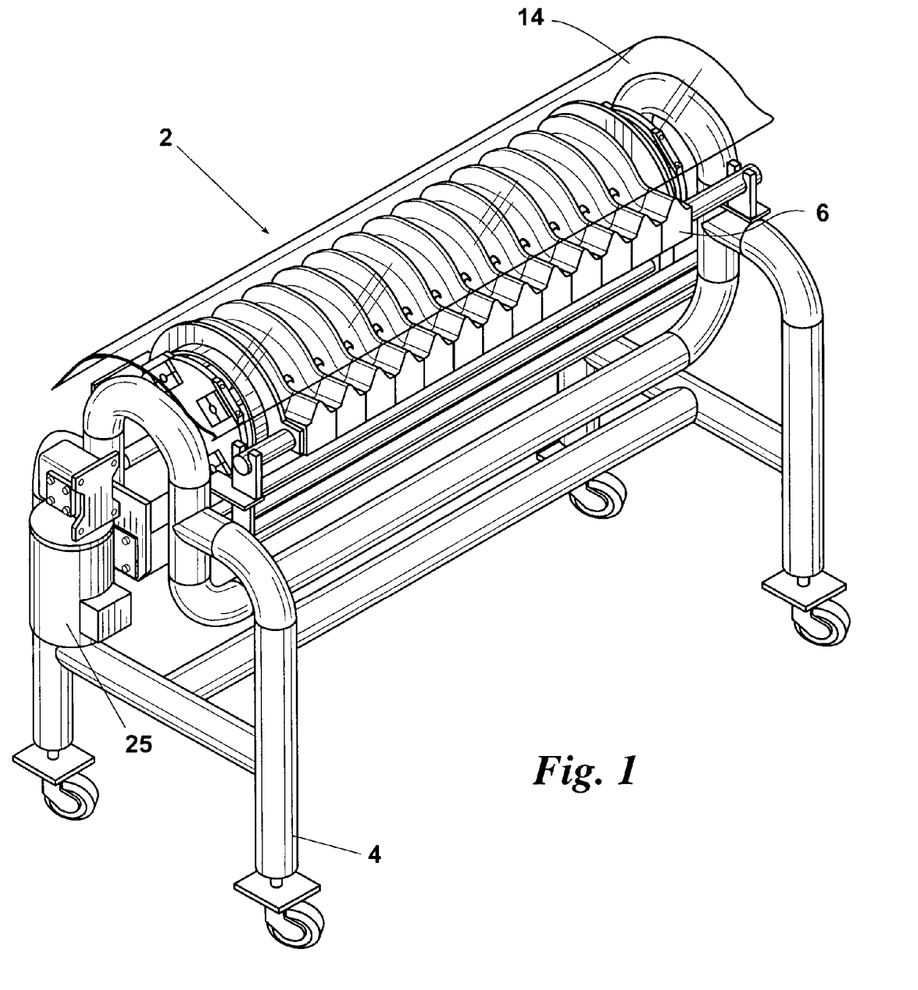
FIG. 1 is a perspective view of an embodiment 2 of the singulation apparatus provided by the present invention.
Figure 2:
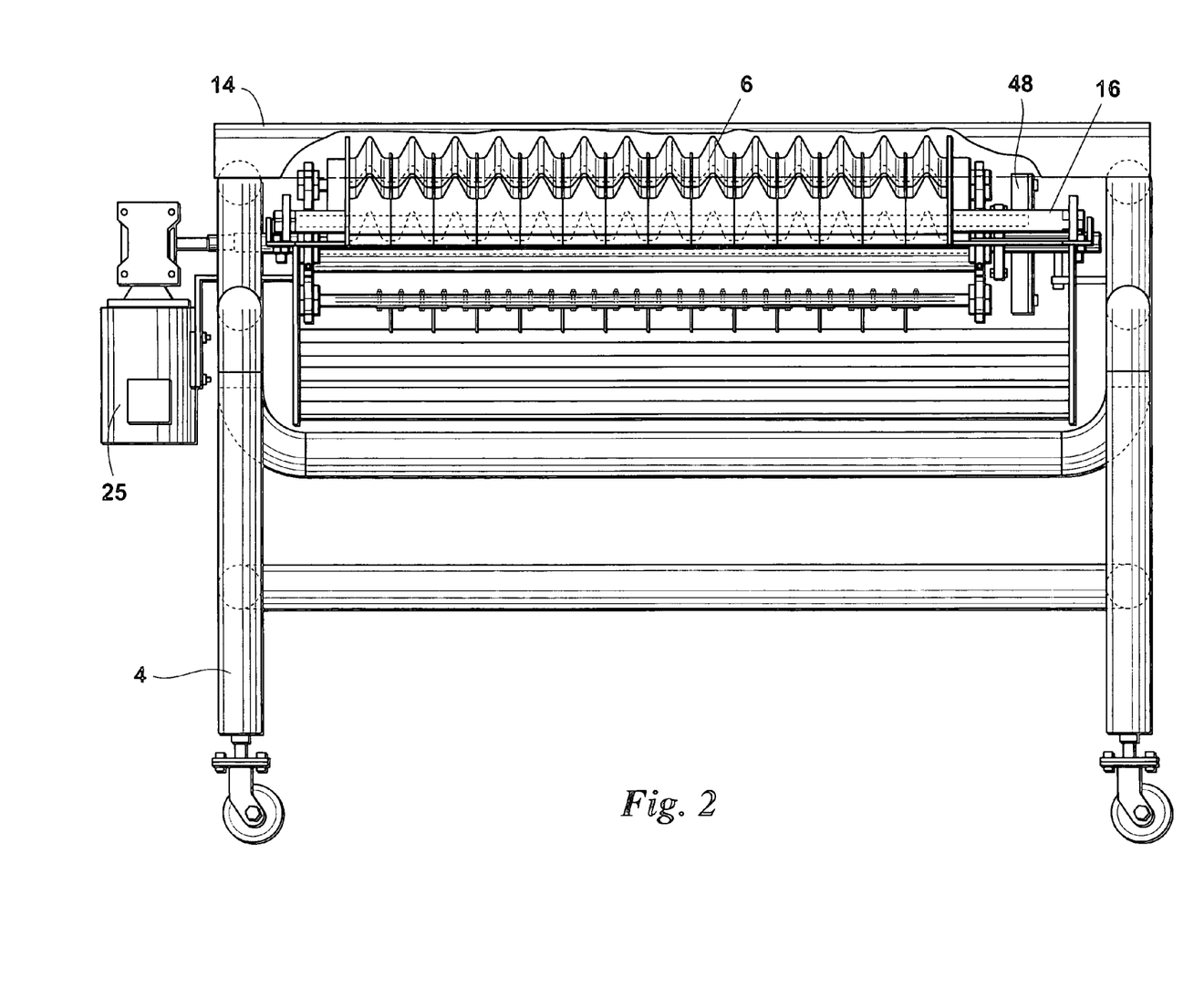
FIG. 2 is an elevational side view of the inventive singulation apparatus 2.
Figure 3:
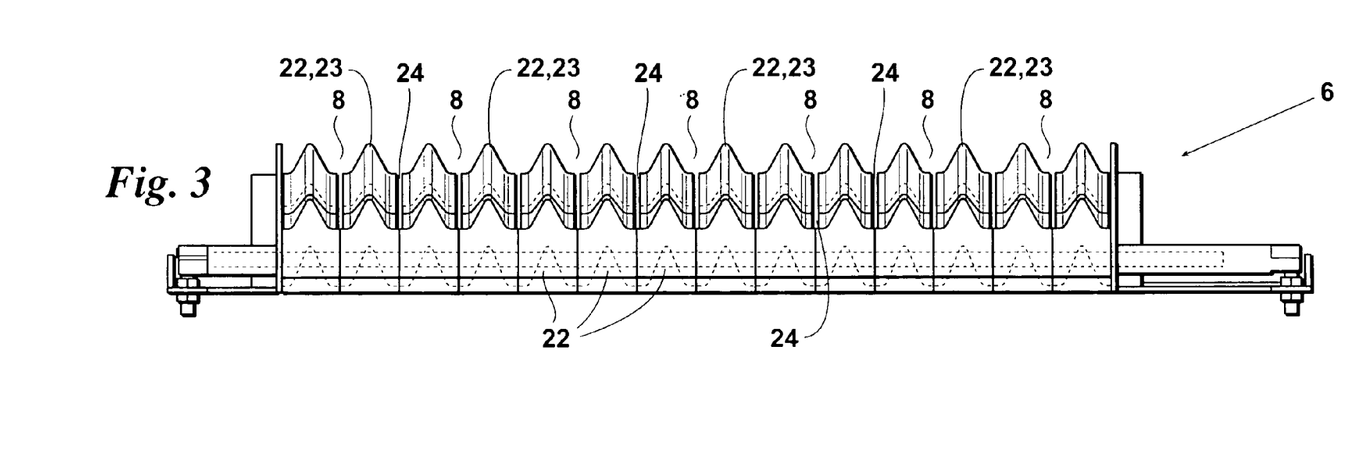
FIG. 3 is an elevational receiving side view of a product channel array 6 employed in the inventive singulation apparatus 2.
Figure 4:
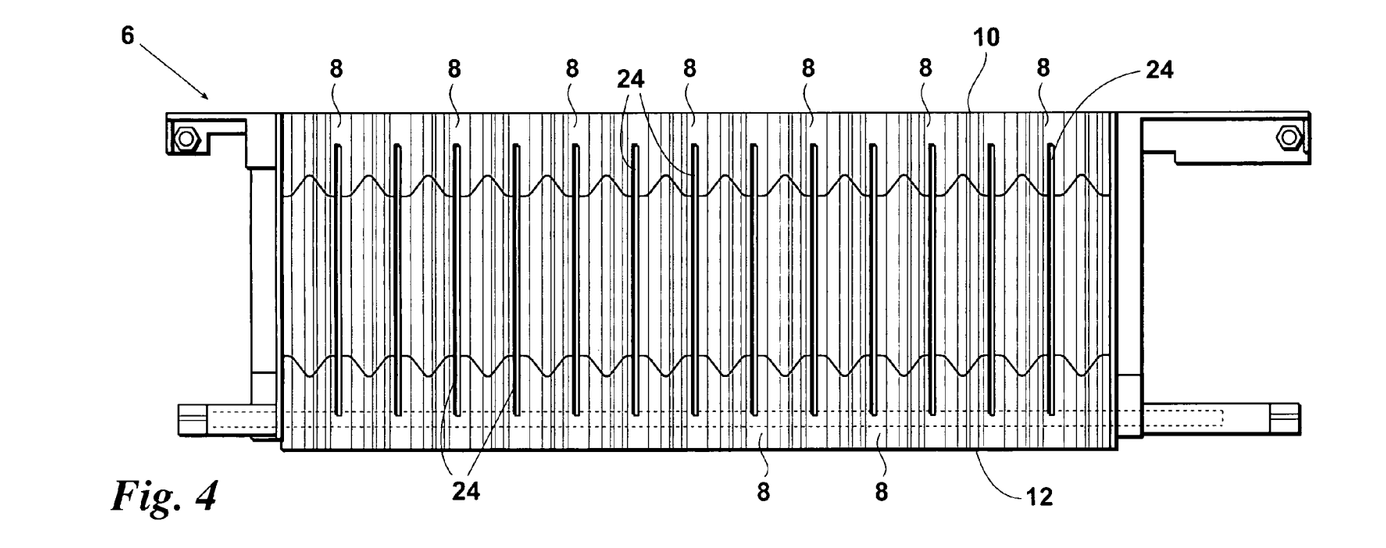
FIG. 4 is a plan view of the product channel array 6.

The array 6 of side-by-side product channels 8 is formed by a series of adjacent, upwardly arched channel segment pieces 22. Each of the channel segment pieces 22 includes a projecting upwardly curved ridge 23 which extends from the receiving side 10 to the delivery side 12 of the device. The upper ridges 23 have a rounded, upside-down V cross-sectional shape so that the resulting product channels 8 formed between the adjacent pairs of the channel segment pieces 22 each have a lateral shape in the form of an open, outwardly diverging U. In addition, the adjacent channel segment pieces 22 are configured such that a slot 24 extending from the receiving side 10 to the delivery side 12 is provided through the bottom of each product channel 8. As discussed more fully below, the product catch members 18 are retractably receivable through the slots 24 such that the catch members 18 are allowed to rotate through the product channels 8.

Figures 5, 9:
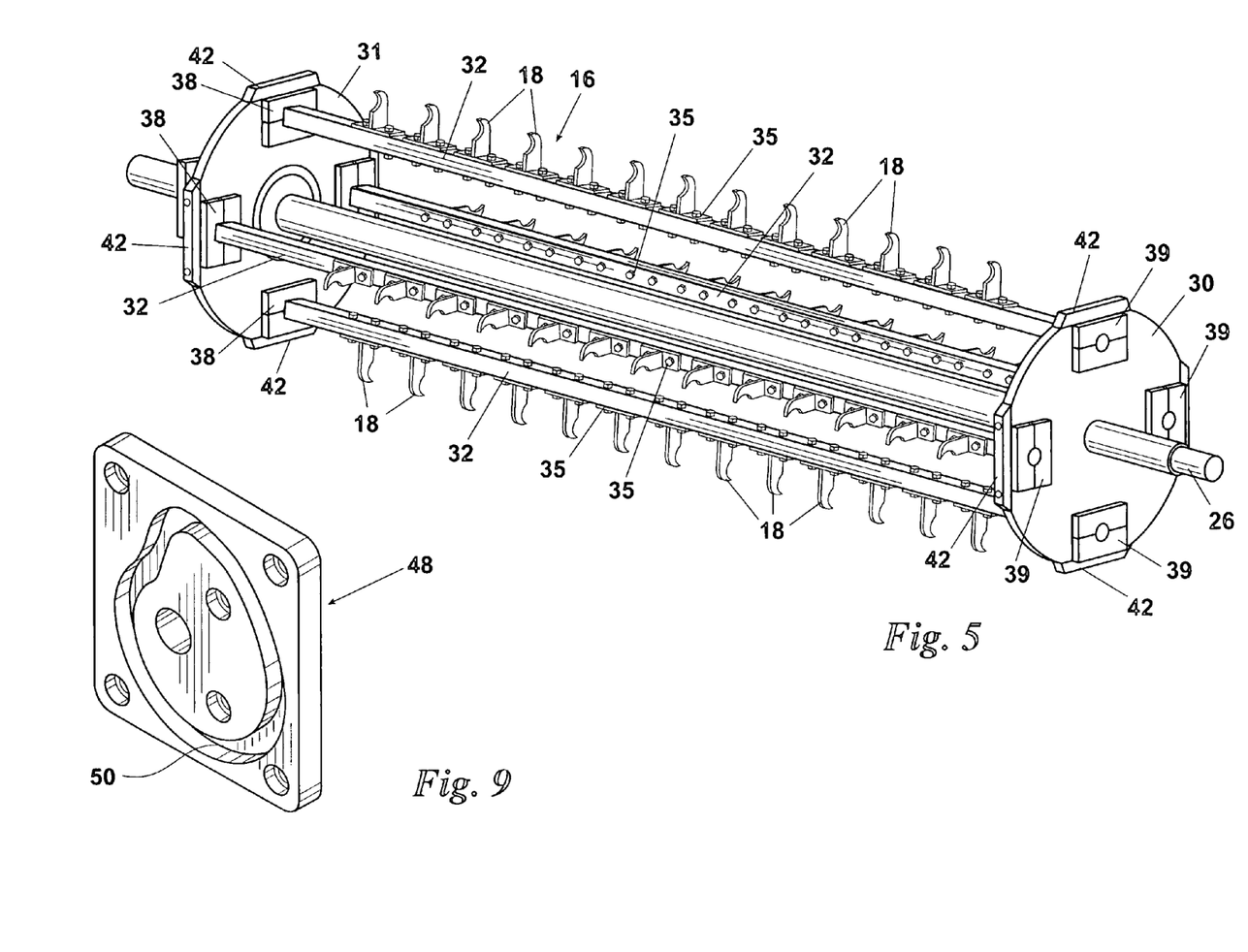
FIG. 5 is a perspective view of a rotating assembly 16 employed in the inventive singulation apparatus 2.
FIG. 9 is a perspective view of a cam block element 48 employed in the inventive singulation apparatus 2.
Figure 6:
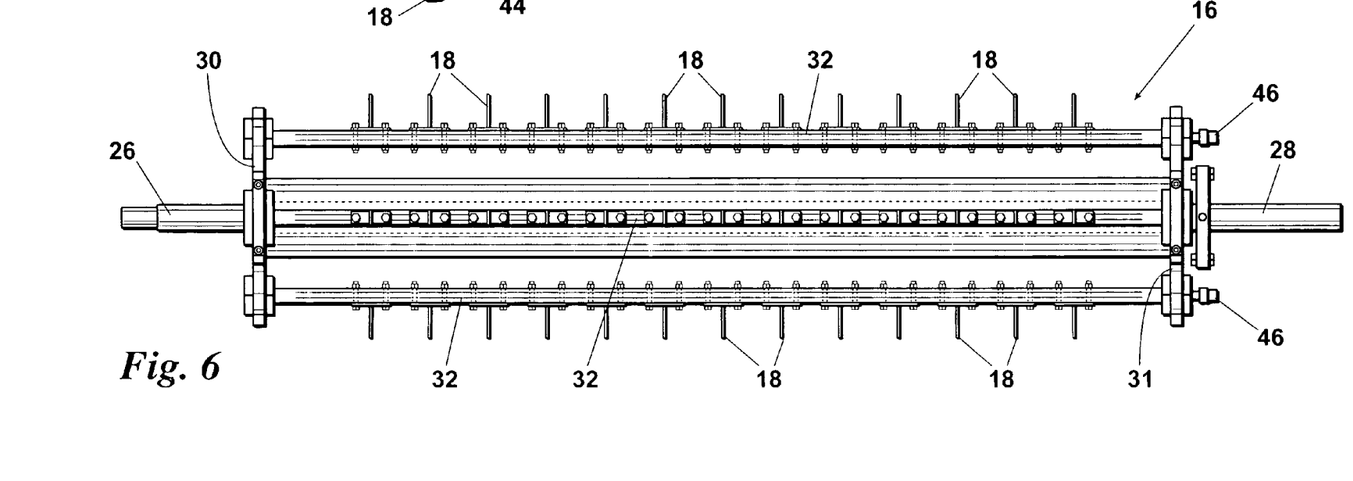
FIG. 6 is an elevational side view of the rotating assembly 16.
Figure 7:
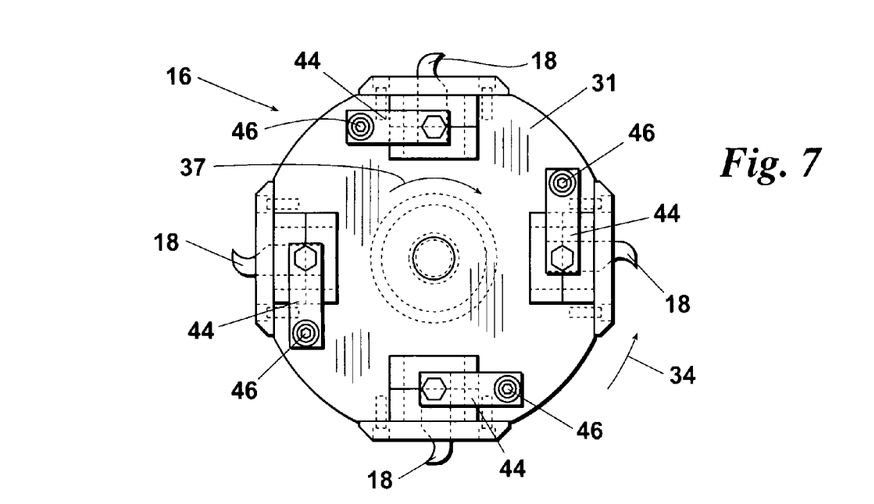
FIG. 7 is an elevational end view of the rotating assembly 16.

The rotating assembly 16 of the inventive apparatus 2 comprises: an elongate center shaft 26 which is rotatably mounted in the frame 4 for rotation of the assembly 16 about the longitudinal axis 28 of the center shaft 26; a pair of opposing end plates 30 and 31 secured on the center shaft 26; at least one (preferably a plurality and most preferably four) pivot shafts 32 which are rotatably mounted between the end plates 30 and 31 and which run parallel to and are spaced apart from the central axis of rotation 28; and a motor and gear assembly 25 or other drive assembly for turning the rotating assembly 16. Each pivot shaft 32 carries a set 35 of the catch members 18 corresponding to the number of product channels 8 in the array 6.

As the rotating assembly 16 rotates about the central axis 28, the respective set(s) 35 of catch members 18 on the pivot shaft(s) 32 continuously (and sequentially) rotate through the upwardly arched product channels 8 from the receiving side 10 to the delivery side 12 of the device. As each set of catch members 18 approaches the ends of the slots 24 on the delivery side 12 of the device, the pivot shaft 32 carrying the catch members 18 is automatically rotated with respect to the end plates 30 and 31 of the rotating assembly 16 so that the catch members 18 are caused to retract from the channel slots 24 and release the produce pieces 20. The catch members 18 are then pivoted back to their projecting positions before beginning their next cycle through the product channels 8.

The pivot direction 34 of the catch members 18 as they approach the ends of the channel slots 24 will preferably be opposite the rotational direction 37 of the rotating assembly 16. As a result, the retracting and releasing motion of the catch members 18 as they approach the ends of the channel slots 24 is substantially perpendicular to the product pieces 20 such that the catch members 18 will more readily release the product pieces 20 without tearing or scarring the products.

Figure 8:
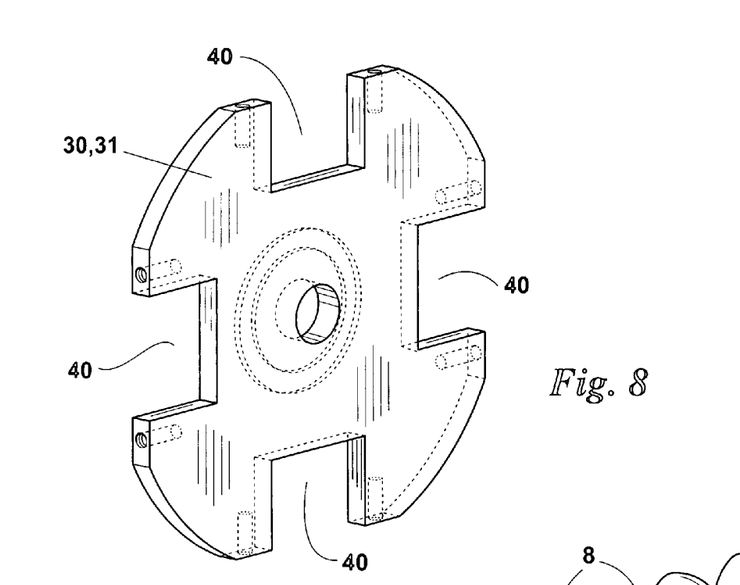
FIG. 8 is a perspective view of an end plate 30 employed in the rotating assembly 16.
Figure 10:
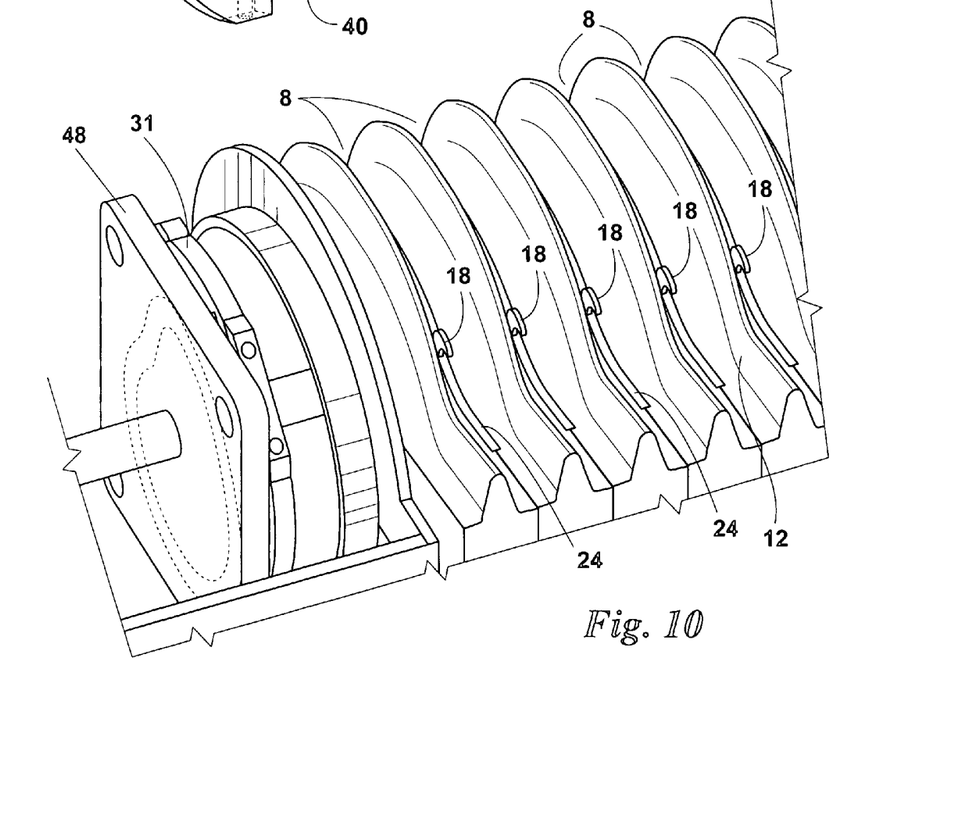
FIG. 10 is a perspective sectional view of a portion of the inventive singulation apparatus 2.

In order to rotatably mount each pivot shaft 32 between the end plates 30 and 31 of the rotating assembly 16, each pivot shaft assembly preferably further comprises a pair of split bushings 38 and 39 through which the ends of the pivot shaft 32 are rotatably received. The split bushings 38 and 39 are preferably formed from Acetyl (Delrin) or other suitable low friction material. Corresponding outer slots 40 are formed in each of the rotating assembly end plates 30 and 31 for receiving each pair of split bushings 38 and 39. The bushings 38 and 39 are retained in the slots 40 by caps 42 which are removably bolted to the outer rims of the end plates 30 and 31 over the slots 40.

In order to automatically pivot the catch members 18 as necessary so that they will project from the slots 24 as they rotate through the product channels 8 and automatically then retract from the slots 24 as they reach the delivery end of the channel 8, a cam swing arm 44 is preferably provided on each pivot shaft 32. In each case, the cam swing arm 44 is preferably positioned on a projecting end of the pivot shaft 32 outside of end plate 31 and has a cam follower 46 provided thereon. The cam follower 46 is configured for interacting with a cam element 48. The cam element 48 is preferably installed in fixed position in the inventive singulation apparatus 2 and is configured for guiding the cam follower 46 in a manner effective for pivoting the swing arm 44 and the catch members 18 in conjunction with the rotation of the rotating assembly 16.

As illustrated in FIG. 9, the cam element 48 is preferably a cam block made of low friction material. The cam block 48 has a closed cam track 50 formed in the face thereof which holds and guides the cam follower 46 of each pivot shaft swing arm 44 as the rotating assembly 16 turns within the inventive singulation apparatus 2. The retraction and projection of the catch members 18 is thus precisely controlled as the cam follower(s) 46 continuously rotate around the cam track 50.

Figure 11:
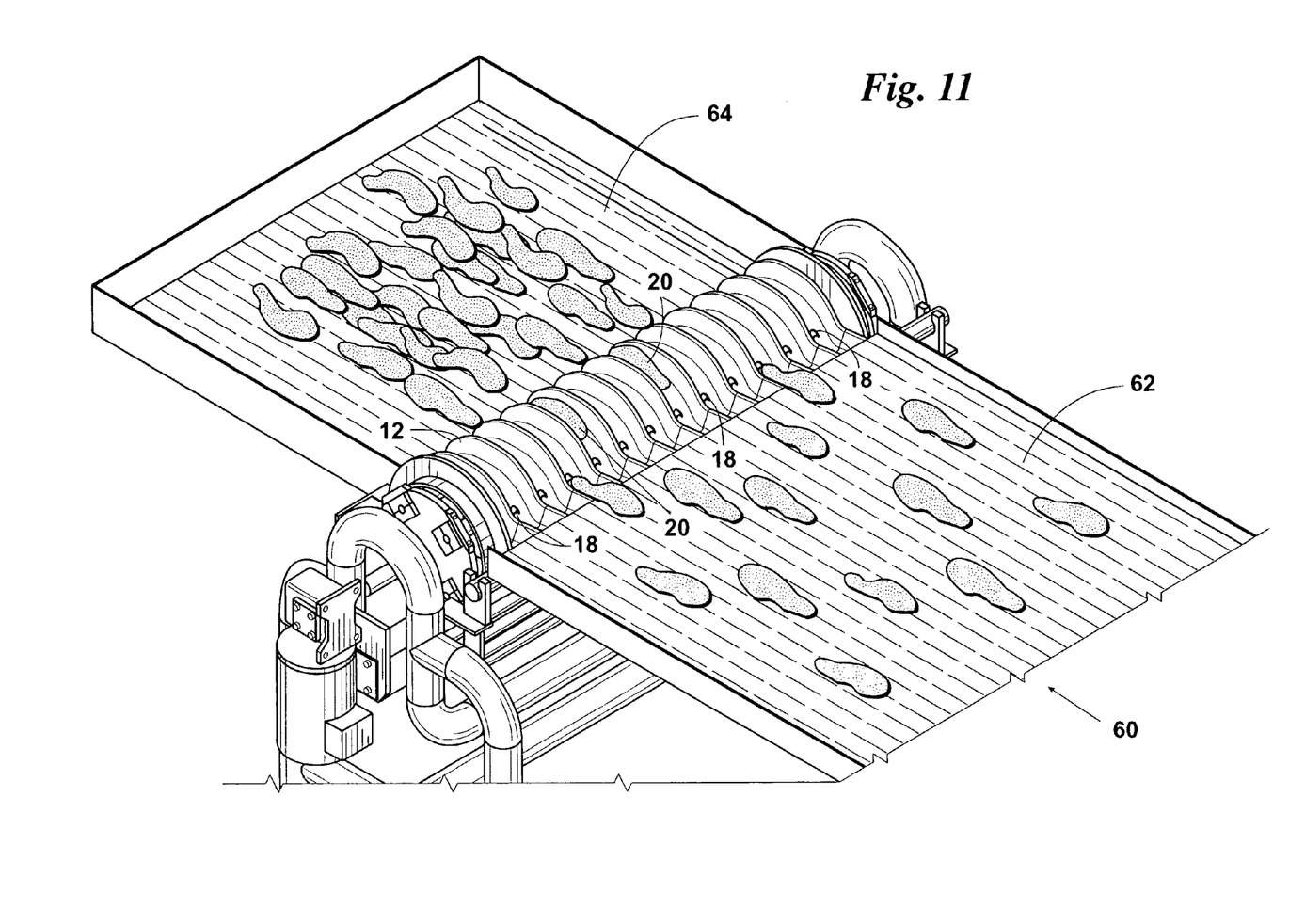
FIG. 11 is a perspective outlet end view of an embodiment 60 of the singulation system provided by the present invention.

An embodiment 60 of the system provided by the present invention for delivering tenders, strips, or other poultry, meat, or fish product pieces 20 to the inventive singulation apparatus 2 and properly positioning the product pieces 20 on a conveyor belt 62 is illustrated in FIG. 11. The conveyor 62 is positioned on the delivery side 12 of the inventive singulation apparatus 2 and can be a wire mesh conveyor or any other type of conveyor employed in the art. The inventive system 60 preferably includes a shaker tray device 64 of a type known in the art positioned on the receiving side 10 of the inventive singulation apparatus 2. As the product pieces 20 accumulate on the receiving side 10 of the singulation device 2, the shaker tray desirably operates to spread the product pieces 20 across the entire width of the product channel array 6. Consequently, the product pieces 20 are continuously and consistently delivered to all of the product channels 8 and are distributed and positioned across the entire width of the conveyor 62.

As the product pieces 20 arrive and/or accumulate on the receiving side 10 of the inventive singulation apparatus 2, the product pieces 20 are caught by the rotating catch members 18 and are individually lifted and pulled over and through the product channels 8. As the products reach the delivery side 12 of the inventive singulation apparatus 2, the catch members 18 automatically retract from the slots 24 of the product channels 8 such that the product pieces 20 are released and are deposited from the product channels 8 onto the conveyor 62. When deposited, the product pieces 20 are appropriately spaced and separated laterally on the conveyor 62 as a result of the spacing between the side-by-side product channels 8. In addition, the number and spacing of the catch member pivot shafts 32 employed in the rotating assembly 16 will preferably be selected to ensure that the product pieces 20 are spaced apart and separated longitudinally as they are placed on the conveyor 62. Moreover, the product channels 8 of the inventive singulation apparatus 2 are also effective for properly orienting elongate products such as tenders or strips so that they are consistently placed in alignment with the direction of travel of the conveyor 62.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for positioning poultry, meat, or fish product pieces on a conveyor comprising:
   an array of at least two upwardly arched product channels having a receiving side and a delivery side and said upwardly arched product channels having slots therein extending from said receiving side to said delivery side;
   a plurality of catch members mounted for retractably projecting from said slots and for rotating through said upwardly arched product channels in a manner effective for catching and lifting said product pieces on said receiving side, pulling said product pieces through said upwardly arched product channels to said delivery side and retracting from said slots on said delivery side; and
   a rotatable assembly for rotating said catch members through said upwardly arched product channels and wherein said catch members are pivotably mounted on said rotatable assembly for retracting said catch members from said slots.

2. The apparatus of claim 1 wherein said rotatable assembly has a longitudinal axis of rotation and said rotatable assembly further comprises:
   a pair of lateral end plates mounted for rotation about said longitudinal axis of rotation and
   a pivot shaft rotatably mounted between said pair of lateral end plates, wherein at least a portion of said catch members project from said pivot shaft and said pivot shaft is parallel to and spaced apart from said longitudinal axis of rotation.

3. The apparatus of claim 2 further comprising:
   a pivot arm extending from said pivot shaft;
   a cam mounted in fixed position in said apparatus; and
   a cam follower on said pivot shaft for following said cam as said rotatable assembly rotates about said longitudinal axis of rotation such that said portion of said catch members are pivoted with respect to said lateral end plates in a manner effective for retracting said portion of said catch members from said slots on said delivery side.

4. The apparatus of claim 3 wherein said cam has a closed track wherein said cam follower is received.

5. The apparatus of claim 2 wherein said pivot shaft is a first pivot shaft, said portion of said catch members is a first portion of said catch members and said rotatable assembly further comprises a second pivot shaft rotatably mounted between said lateral end plates, wherein a second portion of said catch members project from said second pivot shaft and said second pivot shaft is parallel to and spaced apart from said longitudinal axis of rotation.

6. The apparatus of claim 5 further comprising:
   a first pivot arm extending from said first pivot shaft;
   a second pivot arm extending from said second pivot shaft;
   a cam mounted in fixed position in said apparatus;
   a first cam follower on said first pivot shaft; and
   a second cam follower on said second pivot shaft,
   wherein said first and said second cam followers are effective for following said cam as said rotatable assembly rotates about said longitudinal axis of rotation such that said first and said second portions of said catch members are pivoted with respect to said lateral end plates in a manner effective for retracting said first and said second portions of said catch members from said slots on said delivery side.

7. The apparatus of claim 6 wherein said cam has a closed track wherein said first and said second cam followers are received.

8. A system for positioning poultry, meat, or fish product pieces on a conveyor comprising:
   a singulation device having
      an array of at least two upwardly arched product channels having a receiving side and a delivery side and said upwardly arched product channels having slots therein extending from said receiving side to said delivery side,
      a plurality of catch members mounted for retractably projecting from said slots and for rotating through said upwardly arched product channels in a manner effective for catching and lifting said product pieces on said receiving side and pulling said product pieces through said upwardly arched product channels to said delivery side, and
      a rotatable assembly for rotating said catch members through said upwardly arched product channels, wherein said catch members are pivotably mounted on said rotatable assembly for retracting said catch members from said slots and
   a shaker tray on said receiving side of said array,
   wherein said rotatable assembly has a longitudinal axis of rotation and said rotatable assembly further comprises:
      a pair of lateral end plates mounted for rotation about said longitudinal axis of rotation and
      a pivot shaft rotatably mounted between said pair of lateral end plates, wherein at least a portion of said catch members project from said pivot shaft and said pivot shaft is parallel to and spaced apart from said longitudinal axis of rotation.

9. The system of claim 8 wherein said singulation device further comprises:
   a pivot arm extending from said pivot shaft;
   a cam mounted in fixed position in said apparatus; and
   a cam follower on said pivot shaft for following said cam as said rotatable assembly rotates about said longitudinal axis of rotation such that said portion of said catch members are pivoted with respect to said lateral end plates in a manner effective for retracting said portion of said catch members from said slots on said delivery side.

10. The system of claim 9 wherein said cam has a closed track wherein said cam follower is received.

11. A method of positioning poultry, meat, or fish product pieces on a conveyor comprising the steps of:
   (a) delivering said product pieces to a receiving side of an array of at least two upwardly arched product channels having catch members which rotate through said upwardly arched product channels;
   (b) continuously catching said product pieces with said catch members;
   (c) lifting and pulling said product pieces with said catch members over and through said upwardly arched product channels from said receiving side to a delivery side of said array; and
   (d) releasing said product pieces from said catch members on said delivery side such that said product pieces are deposited from said upwardly arched product channels onto said conveyor.

12. The method of claim 11 wherein said product pieces are strips or tenders.

13. The method of claim 12 wherein said strips or tenders are deposited onto said conveyor from said upwardly arched product channels in step (d) such that said strips or tenders are oriented longitudinally in directional alignment with said conveyor.

14. The method of claim 12 wherein said strips or tenders have been marinated, breaded, or a combination thereof.

15. The method of claim 11 wherein said product pieces are delivered to said receiving side in step (a) using a shaker tray.

16. The method of claim 11 wherein step (d) includes retracting said catch members from said upwardly arched product channels on said delivery side.

17. An apparatus for positioning poultry, meat, or fish product pieces on a conveyor comprising:
   an array of at least two upwardly arched product channels having a receiving side and a delivery side and said upwardly arched product channels having slots therein extending from said receiving side to said delivery side and
   a plurality of catch members mounted for retractably projecting from said slots and for rotating through said upwardly arched product channels in a manner effective for catching and lifting said product pieces on said receiving side, pulling said product pieces through said upwardly arched product channels to said delivery side and retracting from said slots on said delivery side,
   wherein said catch members are hooked or barbed members.

18. A system for positioning poultry, meat, or fish product pieces on a conveyor comprising:
   a singulation device having
      an array of at least two upwardly arched product channels having a receiving side and a delivery side and said upwardly arched product channels having slots therein extending from said receiving side to said delivery side and
      a plurality of catch members mounted for retractably projecting from said slots and for rotating through said upwardly arched product channels in a manner effective for catching and lifting said product pieces on said receiving side and pulling said product pieces through said upwardly arched product channels to said delivery side, and
   a shaker tray on said receiving side of said array,
   wherein said catch members are hooked or barbed members.

19. An apparatus for positioning poultry, meat, or fish product pieces on a conveyor comprising:
   an array of at least two upwardly arched product channels, each of said upwardly arched product channels having an upwardly arched bottom including an upwardly curving receiving side followed by a downwardly curving delivery side and each of said upwardly arched product channels having a slot in said upwardly arched bottom thereof extending from said receiving side to said delivery side and
   a plurality of catch members mounted for retractably projecting from said slots and for rotating through said upwardly arched product channels in a manner effective for catching and lifting said product pieces upwardly on said receiving side, pulling said product pieces in an upwardly arching path through said upwardly arched product channels to said delivery side, and retracting from said slots on said delivery side.

20. A system for positioning poultry, meat, or fish product pieces on a conveyor comprising:
   a singulation device having
      an array of at least two upwardly arched product channels, each of said upwardly arched product channels having an upwardly arched bottom including an upwardly curving receiving side followed by a downwardly curving delivery side and each of said upwardly arched product channels having a slot in said upwardly arched bottom thereof extending from said receiving side to said delivery side and
      a plurality of catch members mounted for retractably projecting from said slots and for rotating through said upwardly arched product channels in a manner effective for catching and lifting said product pieces upwardly on said receiving side and pulling said product pieces in an upwardly arching path through said upwardly arched product channels to said delivery side and
   a shaker tray adjacent said receiving sides.

21. The system of claim 20 further comprising a conveyor belt adjacent said delivery sides.

22. The system of claim 20 wherein said singulation device further comprises a rotatable assembly for rotating said catch members through said upwardly arched product channels and wherein said catch members are pivotably mounted on said rotatable assembly for retracting said catch members from said slots.

* * * * *